Figure 1:
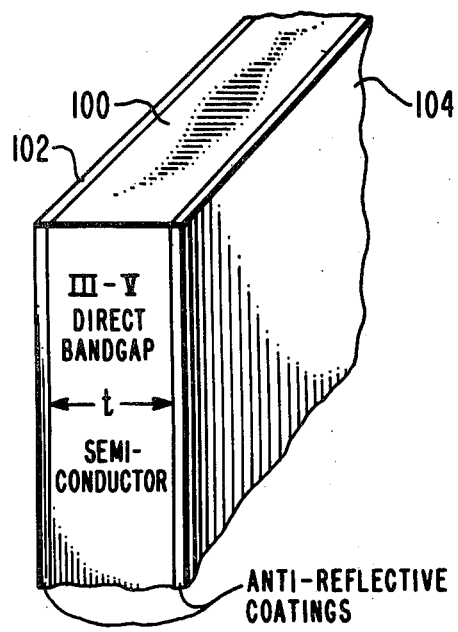

United States Patent [19]

Ettenberg et al.

[11] 4,300,811
[45] Nov. 17, 1981

[54] III-V DIRECT-BANDGAP SEMICONDUCTOR OPTICAL FILTER

[75] Inventors: Michael Ettenberg, Freehold; Charles J. Nuese, North Brunswick, both of N.J.

[73] Assignee: RCA Corporation, New York, N.Y.

[21] Appl. No.: 86,244

[22] Filed: Oct. 18, 1979

Related U.S. Application Data

[62] Division of Ser. No. 937,588, Aug. 28, 1978.

[51] Int. Cl.³ .......................... G02B 5/22; H01B 1/02
[52] U.S. Cl. .................................... 350/1.1; 252/582; 350/1.6; 350/96.15
[58] Field of Search ...................... 250/336, 339, 482; 252/300; 350/1.1, 1.6, 96.15

[56] References Cited

U.S. PATENT DOCUMENTS

| | | | |
|---|---|---|---|
| 2,977,477 | 3/1961 | Rosi et al. | 252/300 |
| 3,482,088 | 12/1969 | Ansley | 350/311 |
| 3,533,967 | 10/1970 | McNeely et al. | 252/300 |

*Primary Examiner*—Stewart J. Levy
*Attorney, Agent, or Firm*—Samuel Cohen; George J. Seligsohn

[57] ABSTRACT

A thin plate of III-V direct-bandgap semiconductor, preferably with anti-reflective coatings, operates as superior optical filter for light having a wavelength which exceeds a given wavelength in the visible or infra-red spectrum. Such a filter is particularly suitable for use in a duplex optical communication system employing a fiber-optic transmission line.

5 Claims, 3 Drawing Figures

III-V DIRECT-BANDGAP SEMICONDUCTOR OPTICAL FILTER

This is a division of application Ser. No. 937,588 filed Aug. 28, 1978.

This invention relates to an optical filter and, more particularly, to such a filter particularly suitable for use in a duplex communication system comprising a fiber-optic transmission line extending between first and second terminals.

A duplex optical communication system employs optical wave energy of relatively long wavelength for communications in one direction between a pair of terminals and employs optical wave energy of relatively short wavelength for communication in the opposite direction between the pair of terminals. Situated at each of the terminals is an optical detector, which may be a silicon detector. A silicon detector is sensitive to both relatively short- and relatively long-wavelength optical wave energy, although it is significantly more sensitive to relatively short-wavelength optical wave energy in the visible spectrum than it is to relatively long wavelength energy in the near infra-red spectrum. In order to prevent cross-talk in a duplex optical communication system, it is essential that each of the optical detectors has associated therewith an appropriate optical filter. Specifically, the filter situated at the terminal which receives long-wavelength optical wave energy is designed to pass long-wavelength optical wave energy and reject short-wavelength optical wave energy. Similarly, the optical filter situated at the terminal which receives short-wavelength optical wave energy is designed to pass short-wavelength optical wave energy and reject long-wavelength optical wave energy.

The present invention is directed to an optical filter comprising a plate of III-V direct bandgap semiconductor having a thickness between opposing faces thereof in a range of 50-400 micrometers. Such an optical filter, preferably including an anti-reflective coating on each of its opposing faces, is particularly suitable for use as the long-wavelength pass/short-wavelength reject optical filter of a duplex optical communication system.

Figure 2:
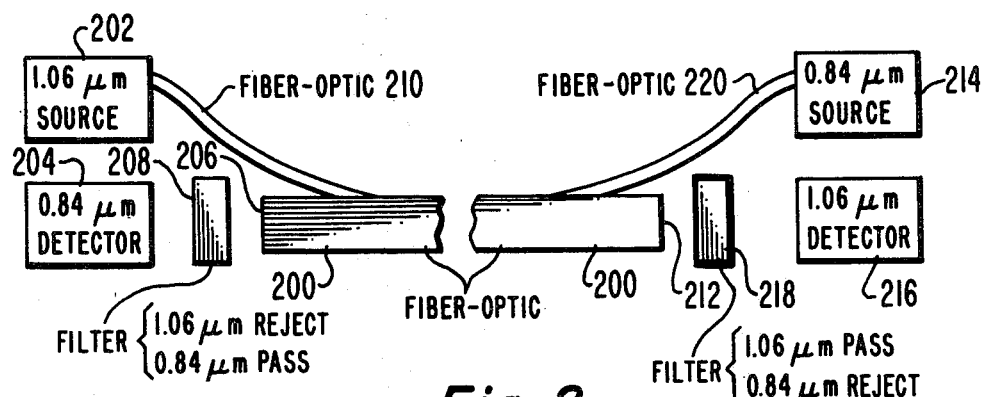
Figure 3:
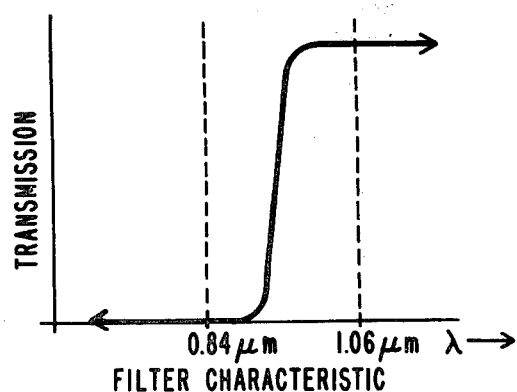

In the Drawing:

FIG. 1 schematically illustrates an embodiment of a III-V direct bandgap semiconductor optical filter employing the principles of the present invention;

FIG. 2 schematically illustrates an embodiment of a duplex optical communication system that incorporates a particular III-V direct-bandgap semiconductor optical filter of the type shown in FIG. 1, and FIG. 3 is a graph of the optical transmission characteristics of the particular III-V direct-bandgap semiconductor optical filter incorporated in the embodiment of FIG. 2.

The optical filter shown in FIG. 1 comprises a thin plate of III-V direct-bandgap semiconductor 100, which has a thickness t in the range of 50–400 micrometers. Semiconductor 100 exhibits a direct band structure with an energy bandgap value that corresponds to a given optical wavelength (i.e., Planck's constant times the velocity of light divided by the given wavelength). Photons of optical wavelength shorter than that of the given wavelength have an energy greater than the energy-bandgap value, and therefore, interact with and are absorbed by the semiconductor. However, photons having a wavelength longer than the given wavelength have insufficient energy to interact with the semiconductor, and, therefore, are passed therethrough. The thickness t of semiconductor 100 and should be sufficient to provide substantially complete absorption of the shorter wavelength photons, while offering very little attenuation to the longer wavelength photons. A thickness of semiconductor plate 100 in the range 50–400 micrometers meets these conditions. However, since III–V direct bandgrap semiconductor exhibits a relatively high index of refraction with respect to that of air (which normally surrounds an optical filter), it is desirable to cover the opposed faces of the semiconductor 100 with anti-reflective coatings 102 and 104, respectively, in order to minimize the amount of long-wavelength wave energy (passed by the optical filter) that is lost by reflection.

As known in the art, a III–V direct-bandgap semiconductor comprises a compound or alloy of one or more selected III-valance semiconductor elements and one or more selected V-valence semiconductor elements. The energy bandgap value that is exhibited by a direct-bandgap semiconductor (and hence the given wavelength of the filter which corresponds thereto) is determined by the particular mixture of selected III and selected V valance elements of which semiconductor 100 is composed. By choosing an appropriate mixture, any given wavelength within an optical spectrum which includes a wide range of both visible and infra-red wavelengths can be selected. For instance, $Al_xGa_{1-x}As$ (x=0 to 0.32) can be used as a filter between radiation of $\lambda=0.9$ and 0.7 micrometers $In_xGa_{1-x}As$ (x=0 to 1.0) between $\lambda=0.9$ and 3.3 micrometers.

Referring to FIG. 2, there is shown a duplex optical communication system comprising fiber-optic transmission line 200 (which may be more than one-half kilometer in length) extending between a first terminal and a second terminal. The first terminal, in the vicinity of left-end 206 of fiber-optic 200, includes first light source 202 and first light detector 204. First light source 202, which may be a light-emitting diode or a solid-state laser, generates relatively long (1.06 micrometer) wavelength light. First detector 204, which may be a silicon detector, is used to detect relatively short (0.84 micrometer) wavelength light. Specifically, first detector 204 is spaced from and aligned with left end 206 of fiber-optic 200. Inserted between left end 206 and first detector 204 is a conventional dichroic optical filter (which is composed of alternating layers of varying index of refraction materials). Optical filter 208 is designed to pass relatively short-wavelength (0.84 micrometer) optical wave energy. (Since the III–V direct bandgap semiconductor optical filter of the present invention is capable of operating only as a filter which passes relatively long wavelength and rejects relatively short wavelength optical energy, a dichroic filter is employed for optical filter 208 despite the fact that its reject-pass ratio is much less than that of the III–V direct-bandgap semiconductor optical filter of the present invention). First light source 202 is coupled to a region of fiber-optic 200 in the neighborhood of left-end 206 by fiber-optic 210. Fiber-optic 210 has a diameter, such as 20 micrometers, which is less than one-half of the diameter, such as 75 micrometers, of fiber-optic 200.

The second terminal, in the vicinity of right-end 212 of fiber-optic 200, includes second light source 214 and second light detector 216. Second light source 214, which may be a light-emitting diode or a solid-state laser, generates relatively short 0.84 micrometer wavelength light. Second detector 216, which may be a silicon detector, is used to detect relatively long 1.06 micrometer wavelength light. Specifically, second detector 216 is spaced from and aligned with right end 212 of fiber-optic 200. Inserted between right end 212 and second detector 216 is III–V direct-bandgap semiconductor optical filter 218, of the type shown in FIG. 1. Filter 218 is designed to have a direct bandgap which corresponds to a wavelength shorter than 1.06 μm and longer than 0.84 μm. By way of example, filter 218 may comprise a plate approximately 100 micrometers thick, with anti-reflective coatings, which is a lightly doped n-type or p-type semiconductor (having a carrier density no greater tha on the order of $10^{17} cm^{-3}$). Second light source 214 is coupled to a region of fiber-optic 200 in the vicinity of right end 212 by fiber-optic 200 having a diameter, such as 20 micrometers, less than one-half the diameter, such as 75 micrometers, of fiber-optic 200.

FIG. 3 illustrates the transmission characteristics of filter 218.

The duplex optical communication system of the type shown in FIG. 2 must meet the following three conditions in order to operate properly. First, any residual 1.06 micrometer wavelength light energy detected by the silicon detector of first detector 204 is insufficient to cause cross-talk. Second, the residual 0.84 micrometer wavelength wave energy detected by the silicon detector of second detector 216 is insufficient to cause cross-talk. Third, the residual energy reflected from either left end 206 or right end 212 of fiber-optic 200 is promptly removed from the system.

The arrangement shown in FIG. 2 meets all three of these conditions. Specifically, silicon is a much more sensitive detector at the wavelength of 0.84 micrometers than it is at a wavelength of 1.06 micrometers. Therefore, although dichroic filter 208, because of its relatively small amount of rejection, permits a relatively high absolute value of residual 1.06 micrometer wavelength light to reach first detector 204, no cross-talk results because of the low sensitivity of the silicon detector of first-detector 204 to 1.06 micrometer wavelength light. However, by the same reasoning, cross-talk would result in second detector 216, if optical filter 218 were a dichroic filter, due to the high amount of residual 0.84 micrometer wavelength light which would then reach second detector 216 together with the significantly higher sensitivity of the silicon detector of second detector 216 to this residual light than to the desired 1.06 micrometer wavelength light. This problem is obviated in FIG. 2 by employing a III–V direct-bandgap semiconductor optic-filter, of the type shown in FIG. 1, for optical filter 218. It has been found that such a III–V direct bandgap semiconductor filter provides only about 0.1 db attenuation of the desired relatively long 1.06 micrometer wavelength light, but provides more than 50 db rejection for the undesired 0.84 micrometer wavelength light.

The use of relatively narrow diameter fiber-optics 210 and 220 for coupling generated light into relatively wide diameter fiber-optic 200 prevents substantially all the residual light reflected from left and right ends 206 and 212 from returning to respective first and second sources 202 and 220. Instead, the light energy of this reflected residual light is quickly removed from the system when it reaches optical filter 208 or optical filter 218.

What is claimed is:

1. An optical filter suitable for use in a duplex optical communication system in which wave energy of a first optical wavelength longer than a given optical wavelength is employed for communication in one direction and wave energy of a second optical wavelength shorter than said given wavelength is employed for communication in a direction opposite to said one direction, said optical filter comprising a plate of III–V direct-bandgap semiconductor having a thickness between opposed faces thereof in a range of 50–400 micrometers, said direct bandgap exhibiting an energy bandgap corresponding to said given optical wavelength, whereby said filter passes said first optical wavelength with substantially negligible attenuation and rejects said second optical wavelength with substantially complete absorption.

2. The optical filter defined in claim 1, wherein said plate comprises an anti-reflective coating on at least one of said opposed faces thereof.

3. The optical filter defined in claim 1, wherein said plate comprises a first anti-reflective coating on a first of said opposed faces thereof, and a second anti-reflective coating on a second of said opposed faces thereof.

4. The optical filter defined in claim 1, wherein said given optical wavelength is between 0.84 micrometers and 1.06 micrometers.

5. The optical filter defined in claim 4 wherein said thickness of said plate is substantially 100 micrometers and said semiconductor is n-type or p-type semiconductor containing a carrier density no greater than on the order of $10^{17}$ carriers/$cm^3$.

* * * * *